(12) United States Patent
Seres et al.

(10) Patent No.: US 6,375,449 B1
(45) Date of Patent: Apr. 23, 2002

(54) GAS INJECTION PIN MECHANISM FOR PLASTIC INJECTION MOLDING SYSTEMS

(75) Inventors: Tristan Seres, Royal Oak; John D. Blundy, Clarkston, both of MI (US); James W. Hendry, Brooksville, FL (US)

(73) Assignee: Incoe Corporation, Troy, MI (US)

( * ) Notice: Subject to any disclaimer, the term of this patent is extended or adjusted under 35 U.S.C. 154(b) by 0 days.

(21) Appl. No.: 09/599,212

(22) Filed: Jun. 22, 2000

(51) Int. Cl.[7] ............................................... B29C 45/00
(52) U.S. Cl. ...................................... 425/130; 264/572
(58) Field of Search ................................ 425/130, 535, 425/536, 437; 264/572, 500, 335

(56) References Cited

U.S. PATENT DOCUMENTS

| | | | | |
|---|---|---|---|---|
| 4,106,887 A | * | 8/1978 | Yasuike et al. | 425/549 |
| 4,474,717 A | * | 10/1984 | Hendry | 264/45.5 |
| 5,127,814 A | * | 7/1992 | Johnson et al. | 425/130 |
| 5,149,546 A | * | 9/1992 | Nelson | 425/130 |
| 5,186,884 A | * | 2/1993 | Hendry | 264/572 |
| 5,232,654 A | * | 8/1993 | Aida et al. | 264/572 |
| 5,295,801 A | * | 3/1994 | Sugiyama et al. | 425/130 |
| 5,466,141 A | * | 11/1995 | Eckardt et al. | 425/130 |
| 5,518,386 A | * | 5/1996 | Hendry | 425/130 |
| 5,534,216 A | * | 7/1996 | Kamiyama | 264/511 |
| 5,656,234 A | * | 8/1997 | Kaneishi et al. | 264/572 |
| 5,785,247 A | * | 7/1998 | Chen et al. | 239/135 |
| 5,820,889 A | * | 10/1998 | Erikson | 425/130 |

\* cited by examiner

*Primary Examiner*—Nam Nguyen
*Assistant Examiner*—Joseph S. Del Sole

(57) ABSTRACT

A gas injection pin mechanism for introducing pressurized gas into a mold cavity or melt stream. A stationary pin member is positioned directly in a bore or opening in a mold member without a sleeve member. The pin member is an elongated body member with a first end facing a mold cavity and a first gas passageway through the pin member connected to a second passageway that is traverse to the first gas passageway. The second gas passageway has an opening on an exterior lateral surface of the pin member and gas through the second gas passageway is introduced into the cavity in annular space between the pin member and the mold opening.

1 Claim, 1 Drawing Sheet

GAS INJECTION PIN MECHANISM FOR PLASTIC INJECTION MOLDING SYSTEMS

TECHNICAL FIELD

The present invention relates to plastic injection molding systems and more particularly to gas injection pin mechanisms for such systems.

BACKGROUND OF THE INVENTION

There are numerous known systems for plastic injection molding which utilize a gas to assist in the molding operation. In conventional plastic injection molding systems, plastic pellets are melted in an injection molding machine and advanced by a screw ram into a mold cavity. The mold cavity is formed between two mold halves (a core member and a cavity member), typically through one or more sprue bushings, a manifold and/or a hot runner system. The two halves of the mold are clamped, typically under high pressure, and the plastic is injected into the mold cavity, again under significant pressure in most instances. The molten plastic material in the cavity is allowed to cool and harden in the cavity, typically by a cooling system which circulates a cooling fluid through one or more of the mold members. When the part has sufficiently hardened, the mold is opened and the part is removed, typically by one or more ejector pins.

One of the known systems for utilizing a gas in an injection molding system is commonly known as "gas-assisted injection molding." In these systems, the gas is injected into the molten plastic material through the plastic injection nozzle itself, or through one or more pin mechanisms strategically positioned in the mold, sprue bushings, manifold or hot runner systems. It is also possible to inject the gas directly into the molten plastic in the barrel of the injection molding machine. The gas, which typically is an inert gas such as nitrogen, is injected under pressure and forms one or more hollow cavities or channels in the molded part. The benefits of gas-assisted injection molding processes are well-known, and include the cost savings through the use of less plastic material, producing parts which are lighter in weight, and producing parts which have better surface definitions and finishes.

Another plastic injection molding system which utilizes gas injects the gas into the mold cavity along one or more exterior surfaces of the molded part. The pressurized gas forces the plastic against the opposite surface or surfaces of the mold cavity and forms a part with superior surface characteristics on the appearance surfaces.

There are a number of known systems and mechanisms for introducing the gas into the mold cavity, or melt stream. Many of these utilize moveable or stationary pin mechanisms. These mechanisms selectively introduce gas in or around the pin mechanism as needed for the particular injection molding system being utilized. Pin mechanisms of this type are shown, for example, in U. S. Pat. Nos. Re. 35,705, and 6,042,354.

Although many of these pin mechanisms are satisfactory and work well in their respective operations and systems, there is still a need for improved pin mechanisms for introducing gas into injection molding mechanisms and systems.

SUMMARY OF THE INVENTION

It is an object of the present invention to provide improved pin mechanisms for introducing gas into plastic injection molding mechanisms and systems. It is a further object of the present invention to provide stationary and/or moveable pin mechanisms which can be easily and inexpensively introduced into the mold or associated equipment, without the need for expensive machine operations or sleeve members.

In accordance with the present invention, various pin mechanisms are utilized by which can be directly inserted into bores in mold members, manifolds, hot runner systems or the like in order to introduce gas under pressure into the molten plastic in an injection molding system. In first embodiments of the present invention; stationary pin members are positioned directly in holes or bores in a mold member or the like and provide an annular discharge of gas into the mold cavity or molten plastic. As an alternate embodiment, the height of the stationary pin member in the mold member or related member can be adjusted.

In other embodiments of the present invention, moveable pin members are provided with or without mounting sleeve members. In one of these embodiments, gas is injected through a series of holes positioned around the perimeter of the pin member adjacent its outer end. In another of these embodiments, the pin member is lowered allowing gas to be injected in a solid stream.

Other embodiments, benefits, and features of the present invention will become apparent from the following description of the invention when viewed in accordance with the accompanying drawings and appended claims.

DETAILED DESCRIPTION OF THE PREFERRED EMBODIMENTS(S)

While the present gas injection apparatus and system is intended for use (and described herein) in association with injection molding systems of the type in which hot resin is injected into a mold cavity, gas is injected either into the resin to fill out the mold cavity with resin, or injected along an outer surface of the plastic in a mold cavity, the gas is held at a pressure while the resin sets up and hardens, the gas is vented from the mold, and the mold is open to remove the molded part, the present invention can be used with any type of gas-assisted injection molding systems.

The present invention more particularly relates to a gas injection mechanisms which utilize pin members, either stationary or moveable, which are used to introduce gas into the mold cavity or plastic material. In this regard, although the present invention is being described relative to the gas pins and mechanisms used in mold members to inject gas into the mold cavity, it is also understood that the present inventive gas pins and gas pin mechanisms can be used at any stage or portion of the injection molding system. For example, the gas pins and gas mechanisms can be used to insert gas into a manifold, hot runner bushing or nozzle, hot runner system, sprue bushing, barrel of the injection molding machine, and the like, as well as the mold cavity itself.

Figure 1:
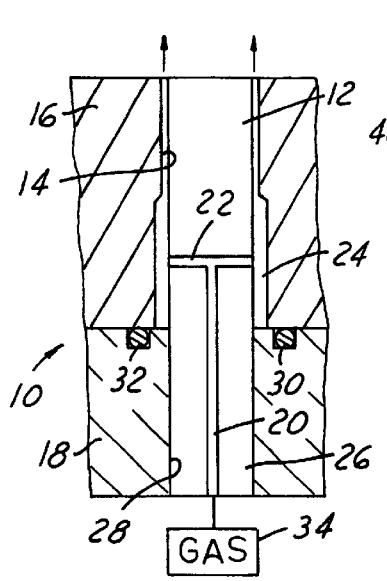
FIG. 1 is a schematic illustration of a first embodiment of the present invention.

A first embodiment of the present invention is shown in FIG. 1 and indicated generally by the reference number 10. The embodiment 10 includes a gas pin member 12 which is positioned in an opening or bore 14 in a mold member 16 or the like. In the embodiment shown, the environment for the gas pin member 12 is a mold cavity member 16 which is positioned on a mold plate 18.

The pin member 12 is a cylindrical solid metal member with a first internal gas channel or passageway 20 formed longitudinally in the pin member and a transverse gas passageway or channel 22. The pin member is positioned in the bore 14 in the mold member 16 with a very minimal clearance therebetween. A second larger bore portion 24 is also formed in the mold member 16 in order to provide additional clearance for the pin member and for gas being injected through the channels 20 and 22. The lower portion 26 of the pin member 12 is also positioned in a bore 28 in the mold plate 18. The pin member 12 can be fixedly secured in the mold member 18 in any conventional manner, such as a press fit, a threaded relationship, or the like. Seals 30 positioned in channel 32, which preferably is annular, prevent gas from leaking out between the mold member 16 and 18.

In operation of the embodiment 10, a pressurized gas is injected from a gas source 34 into the gas channels 20 and 22. The gas proceeds through bores 24 and 14 where it exits the mold member 16 into the plastic material or mold cavity (not shown). With a cylindrical pin member 12 and a cylindrical bore opening 14, a small annular opening is formed between them which allows passage of the gas and yet, at the same time, is sufficiently small to prevent plastic from entering or blocking the annular passageway. The annular opening preferably has a radial width on the order of 0.001–0.010 inches and more particularly 0.001–0.003 inches.

With the embodiment shown in FIG. 1, it is not necessary to provide a sleeve member or the like for positioning or securing the pin member 12. Instead, a simple boring operation to form openings 14 and 24 is sufficient.

Figure 2:
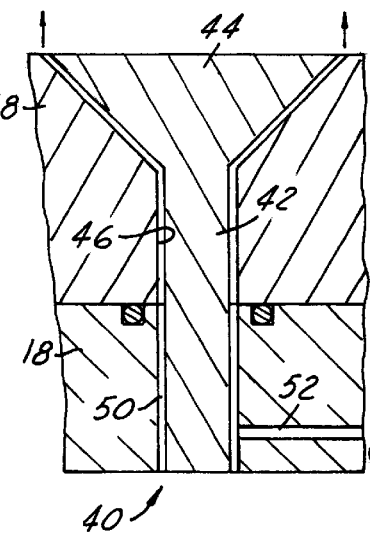
FIG. 2 depicts an alternate embodiment of a stationary pin mechanism in accordance with the present invention.

A second embodiment 40 in accordance with the present invention is shown in FIG. 2. In this embodiment, an elongated pin member 42 has a conically shaped head member 44 on its upper or outer end. The pin member 42 is positioned in a similarly shaped opening or bore 46 in the mold member 48. In this regard, the opening 46 is machined to closely conform to the dimensions of the pin member and head member and to provide an annular channel for passage of gas between them and into the mold cavity or plastic melt (not shown). The pin member 42 is stationary with respect to the mold member 48 and the embodiment 40 does not utilize a sleeve member or the like.

Gas is introduced into the annular passageway 50 in any convention manner, such as the channels shown in FIG. 1, or channel 52 illustrated in FIG. 2.

Figure 3:
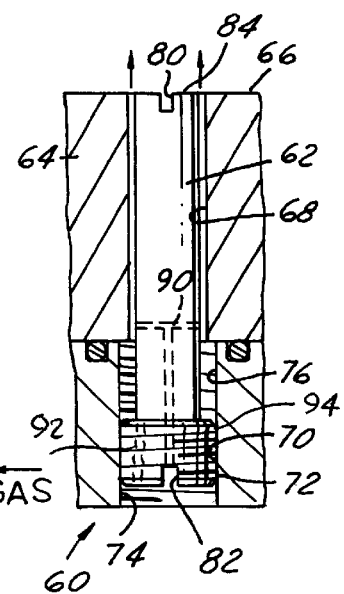
FIG. 3 illustrates an adjustable stationary pin member in accordance with the present invention.

A third embodiment 60 of the present invention is shown in FIG. 3. In this embodiment, the pin member 62 in the mold member 64 is again stationary, similar to the pin members shown in FIGS. 1 and 2, but also is adjustable relative to the surface 66 of the mold cavity or the like. The pin member 62 is positioned in a bore 68 in the mold member 64 and has an enlarged base 70 at its lower end. The base 70 has threads 72 which mate with corresponding thread 74 in the bore 76. Screw or wrench slots 80 and 82 in the top and bottom of the pin member, respectively, can be used to adjust the height of the top 84 of the pin member 62 relative to the surface 66.

Similar to the embodiments described above, it is not necessary to provide a sleeve member in the mold surrounding the pin member. Instead, bores 68 and 76 are machined directly into the mold member 64. In this regard, bore 68 provides a limited clearance around the outer diameter or circumference of pin member 62 in order to provide an annular channel for passage of gas into the mold cavity or melt stream (not shown). Gas, which preferably is an inert gas such as nitrogen, is introduced into the annular space between the pin and mold in any conventional manner. In this regard, a T-shaped gas channel 90 could be utilized to introduce gas into the annular passageway. Also, one or more holes 92 could be formed in the base member 70 for passage of gas, or one or more longitudinal slots 94 could be provided in threads 74 allowing gas to flow past the base member 70 and into the annular cavity.

Although the present invention is described herein with respect to pin members which are circular in cross-section and cylindrical in configuration, it is to be understood that the pin members can have any cross-section and shape. Also, the bores or openings, such as bores 14, 24, 46, 68, etc. can have corresponding or complimentary configurations relative to the pin cross-sections utilized. In this regard, it is important for the actual opening in which the gas enters the mold cavity or melt stream to have a sufficiently small dimension such that plastic will not block it or be allowed to flow into it. It also is not necessary for the annular opening for the gas to pass into the mold cavity or melt stream to have a consistent width or opening size around its perimeter. For example, a multi-sided pin cross-section, such as an octagon-shaped pin member, could be positioned in a circular bore opening in the mold member. Other shapes and configurations in accordance with the general standards and specifications set forth above could be provided by a person skilled in the art in accordance with the present invention.

Figure 4:
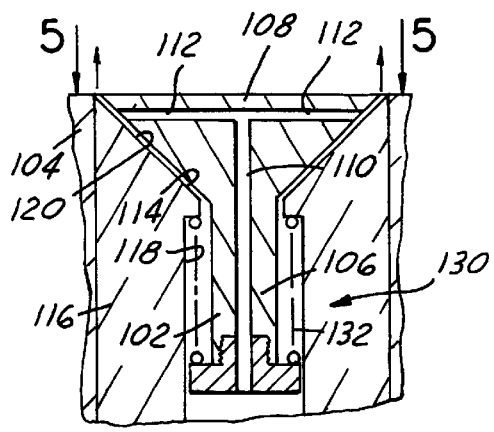
FIGS. 4 and 5 are side and top elevational views of an additional pin member embodiment in accordance with the present invention.
Figure 5:
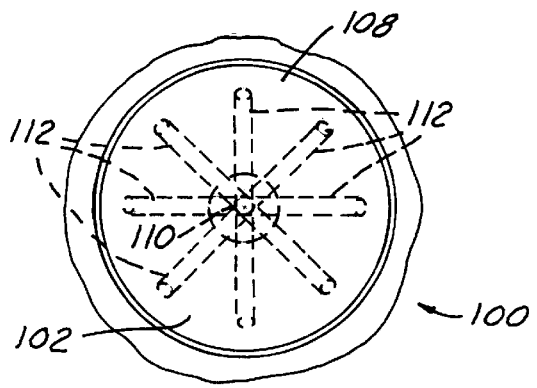

FIGS. 4 and 5 illustrate an embodiment 100 of the present invention in which the pin member 102 is moveable relative to the mold member 104. In this regard, FIG. 4 is a side partial cross-sectional view of the embodiment 100, while FIG. 5 is a top view thereof. The pin member 102 includes an elongated shank member 106 and a conical head member 108. An elongated gas channel 110 is provided in the pin member 102, together with a plurality of radially extending gas passageways 112 in the head member 108.

A bore or opening 114 in the mold member 104, or sleeve member 116, is provided which corresponds to the shape of the pin member 102. In this regard, in the embodiment 100 shown in FIGS. 4 and 5, the bore or opening 114 includes an elongated cylindrical portion 118 and a conically shaped portion 120. The opening 120 and corresponding surface of the head member 108 are configured to mate together tightly when the pin member 102 is in its closed position.

In operation, when it is desired to inject gas through pin member 102 into the mold cavity or plastic melt stream, pressurized gas is introduced through channel 110 and 112 which "pops up" the pin member relative to mold member 104 allowing gas to be introduced into the mold cavity or melt stream. Spring mechanism 130 which utilizes coil spring member 132 is used to return the pin member 102 to its closed position upon termination of the gas flow into the mold or plastic.

Figure 6:
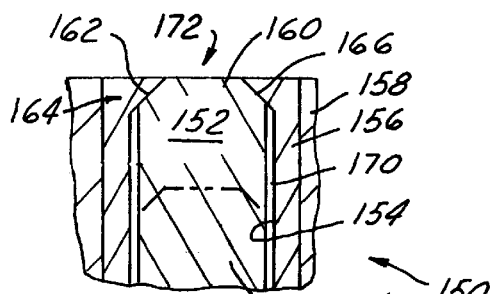
FIGS. 6 and 7 illustrates still other embodiments of the present invention.

Another embodiment 150 of the present invention is shown in FIG. 6. A moveable pin member 152 is positioned in a bore 154 in a sleeve member 156 which is positioned in a mold member, manifold, or the like 158. The upper end 160 of the pin member 152 has a chamfered or slanted surface 162 forming a valve mechanism 164 with a corresponding angled surface 166 of the opening 154. The slanted surfaces 162 and 166 provide a seal preventing gas from escaping into the mold cavity and prevent plastic material from entering into the opening 154. When it is desired to introduce gas into the mold cavity or melt stream, the pin member 152 is moved or lowered to position 152' which allows gas in annular cavity 170 to flow into the mold or plastic through opening 172. The gas flows through opening 172 in a solid cylindrical shape.

The movement of the pin member 152 can be carried in any conventional manner. Preferably, the movement of the pin member 152 is controlled by gas pressure such that when gas under pressure is introduced into passageway 170, the gas pressure forces the pin member 152 downwardly to position 152' in order to allow gas to pass into the cavity or plastic. Thereafter, when the gas pressure is reduced or terminated, a spring mechanism (not shown) returns the pin member to its closed position. In this regard, a spring mechanism similar to the one shown and described above with reference to FIG. 4 could be utilized.

Figure 7:
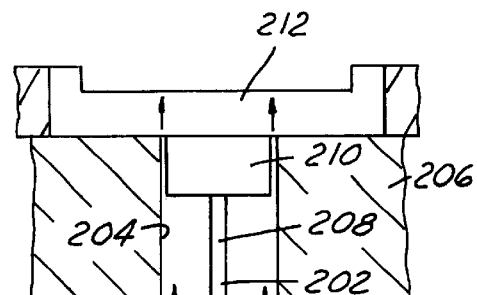

An additional embodiment is shown in FIG. 7 and designated generally by the reference numeral 200. The pin member 202 is positioned in a bore 204 in a mold member 206. The pin member has an elongated central shaft 208 and an enlarged head 210. The diameter of the head is slightly smaller than the diameter of the bore 204 leaving a small annular space for passage of the gas into the mold cavity 212.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A plastic injection molding system comprising a mold with a part-forming cavity therein, said mold having a first opening for entry of a molten plastic material into said cavity and having a second opening for entry of gas into said cavity;

a pin member positioned in said second opening without a sleeve therearound;

said pin member comprising an elongated body member having a first end facing said cavity, an exterior lateral surface along the sides thereof positioned within said second opening, and a second end at a distance from said cavity;

said pin member having a first longitudinally extending gas passageway extending from said second end longitudinally part of the way through said pin member and at least one second gas passageway substantially transverse to said first gas passageway and in connection with said first gas passageway, each of said second passageways having at least one opening on said exterior lateral surface of said pin member, wherein gas passing through said first and second passageways enters into said second opening in the mold and into the part-forming cavity;

a source of pressurized gas, said gas being introduced into said cavity through said second opening; and wherein said pin member is stationary relative to said second opening and mold, and said gas is introduced into said cavity in annular space between said pin member and said second opening.

* * * * *